(12) United States Patent
Jeoung

(10) Patent No.: US 9,136,531 B2
(45) Date of Patent: Sep. 15, 2015

(54) POSITIVE ELECTRODE FOR RECHARGEABLE LITHIUM BATTERY, METHOD OF PREPARING SAME AND RECHARGEABLE LITHIUM BATTERY INCLUDING SAME

(75) Inventor: Jin-Man Jeoung, Yongin-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 1007 days.

(21) Appl. No.: 13/244,231

(22) Filed: Sep. 23, 2011

(65) Prior Publication Data

US 2012/0225357 A1 Sep. 6, 2012

(30) Foreign Application Priority Data

Mar. 2, 2011 (KR) .................. 10-2011-0018618

(51) Int. Cl.
- *H01M 4/36* (2006.01)
- *H01M 4/13* (2010.01)
- *H01M 4/139* (2010.01)
- *H01M 4/62* (2006.01)

(52) U.S. Cl.
CPC ............... *H01M 4/366* (2013.01); *H01M 4/13* (2013.01); *H01M 4/139* (2013.01); *H01M 4/62* (2013.01); *Y02E 60/122* (2013.01)

(58) Field of Classification Search
None
See application file for complete search history.

(56) References Cited

U.S. PATENT DOCUMENTS

| 2007/0224506 A1* | 9/2007 | Ooyama et al. ............ 429/231.3 |
| 2008/0166637 A1* | 7/2008 | Inagaki et al. ............... 429/329 |
| 2009/0220858 A1 | 9/2009 | Cheng et al. |
| 2011/0111291 A1* | 5/2011 | Koga ........................... 429/209 |

FOREIGN PATENT DOCUMENTS

| JP | 3172388 | 3/2001 |
| KR | 10-2000-0031096 | 6/2000 |
| KR | 10-2006-0091442 | 8/2006 |
| KR | 10-2007-0097864 | 10/2007 |
| KR | 1020100007236 | 1/2010 |

OTHER PUBLICATIONS

Wang et al., Electrochemical Evaluation and Structural Characterization of Commercial LiCoO2 Surfaces Modified with MgO for Lithium-Ion Batteries, Journal of the Electrochemical Society, 149 (4) A466-A471 (2002).

Ho-Jin Kweon, et al., Modification of LixNi1-yCoyO2 by applying a surface coating of MgO. Journal of Power Sources 88, 2000, p. 255-261. Cited in attached Korean Office Action issued by KIPO on Oct. 26, 2012 in connection with Korean Patent Application No. 10-2011-0018618.

Korean Office Action issued by KIPO on Oct. 26, 2012 in connection with Korean Patent Application No. 10-2011-0018618 as its priority document and Request for Entry of the Accompanying Office Action attached herewith.

* cited by examiner

*Primary Examiner* — Alix Eggerding
(74) *Attorney, Agent, or Firm* — Robert E. Bushnell, Esq.

(57) ABSTRACT

A positive active material for a rechargeable lithium battery includes a core including a lithiated intercalation compound, and a MgO that is present as an island shape on the core surface and having an average nano-size; a method of manufacturing this positive active material, and a rechargeable lithium battery including this positive active material are provided.

15 Claims, 8 Drawing Sheets

(a)

(b)

POSITIVE ELECTRODE FOR RECHARGEABLE LITHIUM BATTERY, METHOD OF PREPARING SAME AND RECHARGEABLE LITHIUM BATTERY INCLUDING SAME

CLAIM OF PRIORITY

This application makes reference to, incorporates the same herein, and claims all benefits accruing under 35 U.S.C. §119 from an application earlier filed in the Korean Intellectual Property Office on 2 Mar. 2011 and there duly assigned Serial No. 10-2011-0018618.

BACKGROUND OF THE INVENTION

1. Field of the Invention

This disclosure relates to a positive active material for a rechargeable lithium battery, a method of manufacturing the same, and a rechargeable lithium battery including the same.

2. Description of the Related Art

A lithium ion battery is the most recently developed battery in the commercial high-performance rechargeable batteries. Since the battery has a high energy density, a high-speed charge and discharge characteristic, and an excellent cycle performance, the market thereof is rapidly being enlarged.

For positive active materials of a rechargeable lithium battery, lithium-transition element composite oxides being capable of intercalating lithium such as $LiCoO_2$, $LiMn_2O_4$, $LiNi_{1-x}Co_xO_2$ (0<x<1), and the like have been researched.

As for negative active materials of a rechargeable lithium battery, various carbon-based materials such as artificial graphite, natural graphite, and hard carbon, which can all intercalate and deintercalate lithium ions, have been used.

SUMMARY OF THE INVENTION

One embodiment of the present invention provides a positive active material for a rechargeable lithium battery having excellent high rate charge and discharge characteristics and high rate cycle life characteristics.

Another embodiment of the present invention provides a method of manufacturing the positive active material.

Yet another embodiment of the present invention provides a rechargeable lithium battery including the positive active material.

According to one embodiment of the present invention, a positive active material for a rechargeable lithium battery is provided. The positive active material includes a core including a lithiated intercalation compound; and MgO disposed on a surface of the core. The MgO is present in an island formation and has an average nano-size.

The MgO may have an average size of about 10 nm or more and less than about 1000 nm or, for example, about 10 nm to about 500 nm.

The MgO may be doped with M, where M is F, C, N, Si, S, Se, As, Sb, In, Te, P or a combination thereof. The amount of M doped in MgO may range from about 100 ppm to about 400 ppm.

In addition, MgO doped with the M may have an energy gap ranging from about 3.0 eV to about 8.0 eV.

The MgO may be included in about 0.1 wt % to about 30 wt % based on the total amount of positive active material.

According to another aspect of the present invention, a method of manufacturing a positive active material for a rechargeable lithium battery is provided. The method includes performing a mechanofusion process of a lithiated intercalation compound with MgO.

The manufacturing method may further include heating process after the mechanofusion process. The heating process may be performed at from about 900° C. to about 980° C.

According to yet another aspect of the present invention, a rechargeable lithium battery is provided that includes a positive electrode including the positive active material; a negative electrode including a negative active material; and an electrolyte. The positive active material includes a core including a lithiated intercalation compound; and MgO disposed on a surface of the core. The MgO is present in an island formation and has an average nano-size.

Other embodiments of the present invention are described in the detailed description.

The positive active material for a rechargeable lithium battery according to one embodiment may provide a rechargeable lithium battery having excellent high rate charge and discharge characteristics and high rate cycle life characteristics.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Exemplary embodiments will hereinafter be described in detail. However, these embodiments are exemplary, and this disclosure is not limited thereto.

According to one embodiment of the present invention, the provided is a positive active material, which includes a core including a lithiated intercalation compound and a MgO present on the surface of the core in an island type and having an average nano-size. Herein, the meaning of the nano-size is that the size of a particle is in the order of nanometers.

Figure 1:
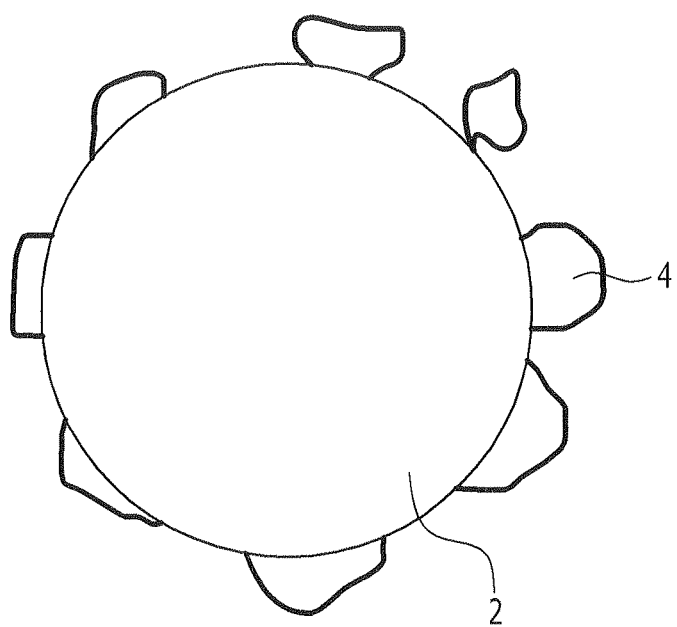
FIG. 1 is a schematic view showing a positive active material for a rechargeable lithium battery according to one embodiment.

In the positive active material 1 according to one embodiment, MgO 4 is disposed on the surface of the core 2 in an island shape (or formation). As shown FIG. 1, particles of MgO 4 are present discontinuously and randomly on the surface of a core 2, and the core surface is not substantially completely coated with MgO, which means MgO is not layered shaped. Herein, the island formation refers to particle distribution, in which particles are randomly and not continuously distributed on the surface of the core. Therefore, in the island formation, particles do not completely cover the surface of the core. If MgO is present as a layer which is substantially completely covering the core surface, it interrupts the intercalation and deintercalation of lithium ion into the core, so it has an adverse effect on the high power characteristics.

According to the positive active material according to one embodiment, MgO may cover the area in about 1 to about 30% based on 100% of the entire area of the core surface. If MgO is present in the core surface and included within this range, it does not cause the deterioration of electric conductivity due to the internal resistance increase, and does not cause the deterioration of battery performance due to the transportation resistance increase by blocking passage of lithium ions.

The MgO may have an average size of about 10 nm or more and less than about 1000 nm, for example, about 50 nm to about 800 nm. When the MgO has the average size within this range, it may further improve the high-rate charge and discharge characteristics.

The MgO may be doped with M, wherein M is F, C, N, Si, S, Se, As, Sb, In, Te, P, or a combination thereof. M may be preferably F, C, N, S, P, or a combination thereof. The amount of M doped on MgO may range from about 100 ppm to about 400 ppm.

In addition, the M-doped MgO may have an energy gap of from about 3.0 eV to about 8.0 eV. When the M-doped MgO has the energy gap of out of this range, the electric conductive characteristics may deteriorate. The energy gap may be calculated from the formula (for example, Tac equation) by performing scanning using light according to the light wavelength to measure the transmission, the reflectivity, the extinction coefficient, the refractive index, and the like.

The MgO amount may range from about 0.1 wt % to about 30 wt % based on the total amount of the positive active material. When the MgO is included within this range, it may provide sufficient effects according to using MgO, without decreases in capacity.

According to one embodiment of the present invention, the MgO amount may be the amount of MgO not doped with M or the amount of MgO doped with M. This is because the M doping amount is too little to significantly affect the MgO amount present on the positive active material if M is doped.

The lithiated intercalation compound is a compound that may reversibly intercalate and deintercalate lithium ions, and any compound that can be generally as a positive active material for a rechargeable lithium battery. Examples of the lithiated intercalation compound include the compound represented by the following chemical formulae. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); and $Li_{(3-f)}Fe_2(PO_4)_3$ ($0 \leq f \leq 2$); and $Li_aFe_{1-g}G_gPO_4$ ($0.90 \leq a \leq 1.8$, $0 \leq g \leq 0.5$)

In the above chemical formulae, A is selected from the group consisting of Ni, Co, Mn, and a combination thereof; X is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

The compound may include a coating layer, or mixed with the compound coated with the coating layer. The coating layer may include at least one coating element compound selected from the group consisting of an oxide of a coating element, and a hydroxide of the coating element, an oxyhydroxide of the coating element, an oxycarbonate of the coating element, and a hydroxycarbonate of the coating element. The coating element compound may be either amorphous or crystalline. The coating element compound may include Mg, Al, Co, K, Na, Ca, Si, Ti, V, Sn, Ge, Ga, B, As, Zr, or a mixture thereof. The coating process may include any conventional processes as long as it does not causes any side effects on the properties of the positive active material (e.g., spray coating, immersing), which is well known to persons having ordinary skill in this art, so a detailed description thereof is omitted.

The positive active material according to one embodiment may be prepared by performing a mechanofusion of MgO with lithiated intercalation compound.

The mechanofusion process may be performed by rotating the lithiated intercalation compound and MgO in a torque of about 500 rpm to about 2000 rpm in a mechanofusion device. When the torque is out of this range, it is insufficiently dry-coated. In addition, the mechanofusion may be performed by rotating in a low speed torque of about 500 rpm to about 1000 rpm for about 5 minutes to 30 minutes, and rotating in a high speed torque of about 1500 to about 2000 rpm for about 5 minute to 30 minutes.

When it is rotated in this torque, the shear stress may be generated in the mechanofusion device to physically bind MgO onto the surface of lithiated intercalation compound.

After the mechanofusion process, it may further include heating the obtained production. The heating process may be performed at about 900° C. to about 980° C. When the heating process is performed within the temperature range, MgO is fused and positioned on the surface but is not inserted in the lithiated intercalation core. The heat treatment process may be performed for about 2 hours to about 4 hours.

In addition, the heating process may be performed by heating until a temperature of about 900° C. to about 980° C. at an increasing rate of about 12 to 15° C./min and maintaining the temperature for about 2 hours to 4 hours. When the heating process is performed under this condition, MgO is fused and positioned on the surface but is not inserted in the lithiated intercalation core.

If it further performs the heating process, the most MgO present as an island shape on the lithiated intercalation compound surface according to the mechanofusion is present as an island shape on the lithiated intercalation compound surface even if a part thereof may be diffused in the lithiated intercalation compound. In addition, if it further performs the heating process, it may decrease the functional group present on the surface and the moisture amount, so as to improve the battery characteristics.

The positive active material may be used in a rechargeable lithium battery. The rechargeable lithium battery according to one embodiment includes a positive electrode including the positive active material, a negative electrode including a negative active material, and an electrolyte.

The positive electrode includes a current collector and a positive active material layer disposed on the current collector. The positive active material is the positive active material according to the above embodiment.

In the positive active material layer, the positive active material may be included in an amount of about 90 wt % to about 98 wt % based on the total weight of the positive active material layer.

The positive active material layer may further include a binder and a conductive material. Each of the binder and the conductive material may be included in an amount of about 1 wt % to about 5 wt % based on the total weight of the positive active material layer.

In addition, in order to provide faster charge/discharge performance and high input/output power, the positive active material layer may further include an activated carbon. When further including the activated carbon, the positive active material may be included in about 80 wt % to about 87 wt %; the binder may be included in about 2 wt % to about 7 wt %; the conductive material may be included in about 2 wt % to about 6 wt %; and the activated carbon may be included in about 2 wt % to about 7 wt %.

The binder improves binding properties of the positive active material particles to each other and to a current collector. Examples of the binder include polyvinylalcohol, carboxylmethylcellulose, hydroxypropylcellulose, diacetylcellulose, polyvinylchloride, carboxylated polyvinyl chloride, polyvinylfluoride, polymer including ethylene oxide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves electrical conductivity of an electrode. Any electrically conductive material may be used as a conductive agent unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber made of copper, nickel, aluminum, silver, and the like; a conductive polymer such as a polyphenylene derivative, and the like; or a mixture thereof.

The current collector may be an aluminum (Al) foil but is not limited thereto.

The positive electrode may be fabricated by a method including mixing a positive active material, a conductive material, and a binder in a solvent to prepare a positive active material composition, and coating a current collector with the composition. The positive electrode manufacturing method is well known and is thus not described in detail in the present specification. The solvent includes N-methylpyrrolidone and the like, but is not limited thereto.

The negative electrode includes a negative active material layer and a current collector supporting the negative active material layer. The negative active material layer may include a negative active material, a binder, and optionally a conductive material.

The negative active material layer may include about 95 wt % to about 99 wt % of the negative active material based on the total weight of the negative active material layer. The negative active material layer may include about 1 wt % to about 5 wt % of a binder based on the total weight of the negative active material layer. When the negative active material layer includes a conductive material, the negative active material layer includes about 90 wt % to about 98 wt % of the negative active material, about 1 wt % to about 5 wt % of the binder, and about 1 wt % to about 5 wt % of the conductive material.

The negative active material includes a material that reversibly intercalates/deintercalates lithium ions, a lithium metal, a lithium metal alloy, a material being capable of doping/dedoping lithium, or a transition metal oxide.

The material that can reversibly intercalate/deintercalate lithium ions includes a carbon material. The carbon material may be any generally-used carbon-based negative active material in a lithium ion rechargeable battery. Examples of the carbon material include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon, a hard carbon, a mesophase pitch carbonized product, fired coke, and the like.

Examples of the lithium metal alloy include lithium and a metal selected from the group consisting of Na, K, Rb, Cs, Fr, Be, Mg, Ca, Sr, Si, Sb, Pb, In, Zn, Ba, Ra, Ge, Al, and Sn.

Examples of the material being capable of doping lithium include Si, $SiO_x$ (0<x<2), a Si-Q alloy (wherein Q is an alkali metal, an alkali-earth metal, a group 13 element, a group 14 element, a group 15 element, a group 16 element, a transition element, a rare earth element, and a combination thereof, and not Si), Sn, $SnO_2$, a Sn—R alloy (wherein R is selected from the group consisting of an alkali metal, an alkali-earth metal, a group 13 element, a group 14 element, a group 15 element, a group 16 element, a transition element, a rare earth element, and a combination thereof, and not Sn) or mixtures thereof. At least one of these materials may be mixed with $SiO_2$. The elements Q and R may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Examples of the transition metal oxide include lithium vanadium oxide, and the like.

The binder improves binding properties of negative active material particles with one another and with a current collector. The binder includes a non-water-soluble binder, a water-soluble binder, or a combination thereof.

The non-water-soluble binder includes polyvinylchloride, carboxylated polyvinylchloride, polyvinylfluoride, polymer including ethylene oxide, polyvinylpyrrolidone, polyurethane, polytetrafluoroethylene, polyvinylidene fluoride, polyethylene, polypropylene, polyamideimide, polyimide, or a combination thereof.

The water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth) acrylic acid alkyl ester, or a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkali metal salts thereof. The alkali metal may be Na, K, or Li. The cellulose-based compound may be included in an amount of 0.1 to 3 parts by weight based on 100 parts by weight of the binder.

The conductive material is included to improve electrode conductivity. Any electrically conductive material may be used as a conductive material unless it causes a chemical change. Examples of the conductive material include carbon-based materials such as natural graphite, artificial graphite, carbon black, acetylene black, ketjen black, carbon fibers, and the like; metal-based materials of metal powder or metal fiber including copper, nickel, aluminum, silver, and the like; conductive polymers such as polyphenylene derivatives; or a mixture thereof.

The negative active material layer may be formed by mixing a negative active material, a binder and optionally a conductive material in a solvent to prepare a negative active material composition, and coating a current collector with the negative electrode composition. A method of manufacturing the negative active material layer is well known, and thus is not described in detail in the present specification. The solvent can be N-methylpyrrolidone but it is not limited thereto. When a water-soluble binder is used for the negative active material layer, the negative active material composition may be prepared using water as a solvent.

In a negative electrode according to one embodiment, the current collector may include a copper foil, a nickel foil, a stainless steel foil, a titanium foil, a nickel foam, a copper foam, a polymer substrate coated with a conductive metal, and a combination thereof, but is not limited thereto.

In a rechargeable lithium battery according to one embodiment, the electrolyte includes a non-aqueous organic solvent and a lithium salt.

The non-aqueous organic solvent serves as a medium of transmitting ions taking part in the electrochemical reaction of the battery.

The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like, and examples of the aprotic solvent include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio can be controlled in accordance with a desirable battery performance.

The carbonate-based solvent may include a mixture with a cyclic carbonate and a linear carbonate. The cyclic carbonate and the linear carbonate are mixed together in a volume ratio of about 1:1 to about 1:9. When the mixture is used as an electrolyte, it may have enhanced performance.

In addition, the non-aqueous organic electrolyte may further include an aromatic hydrocarbon-based solvent as well as the carbonate-based solvent. The carbonate-based solvents and the aromatic hydrocarbon-based solvents may be mixed together in a volume ratio of about 1:1 to about 30:1.

The aromatic hydrocarbon-based organic solvent may be represented by the following Chemical Formula 1.

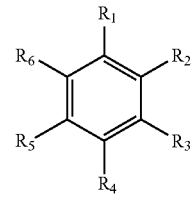

[Chemical Formula 1]

wherein, $R_1$ to $R_6$ are independently hydrogen, a halogen, a C1 to C10 alkyl, a C1 to C10 haloalkyl, or a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include vinylene carbonate or an ethylene carbonate-based compound represented by the following Chemical Formula 2 to improve cycle life.

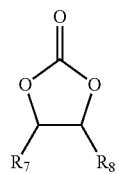

[Chemical Formula 2]

wherein, $R_7$ and $R_8$ are independently hydrogen, a halogen, a cyano (CN), a nitro ($NO_2$), or a C1 to C5 fluoroalkyl, provided that at least one of $R_7$ and $R_8$ is a halogen, a nitro ($NO_2$), or a C1 to C5 fluoroalkyl, and $R_7$ and $R_8$ are not simultaneously hydrogen.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the additive for improving cycle life may be flexibly used within an appropriate range.

The lithium salt is dissolved in an organic solvent, supplies a battery with lithium ions, basically operates the rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI and $LiB(C_2O_4)_2$ (lithium bis(oxalato)borate; LiBOB). The lithium salt may be used in a concentration ranging from about 0.1 M to about 2.0 M. When the lithium salt is included at the above concentration range, an electrolyte may have optimal electrolyte conductivity and viscosity, and may thus have enhanced performance and effective lithium ion mobility.

The rechargeable lithium battery may further include a separator between the negative electrode and the positive electrode, as needed. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 2:
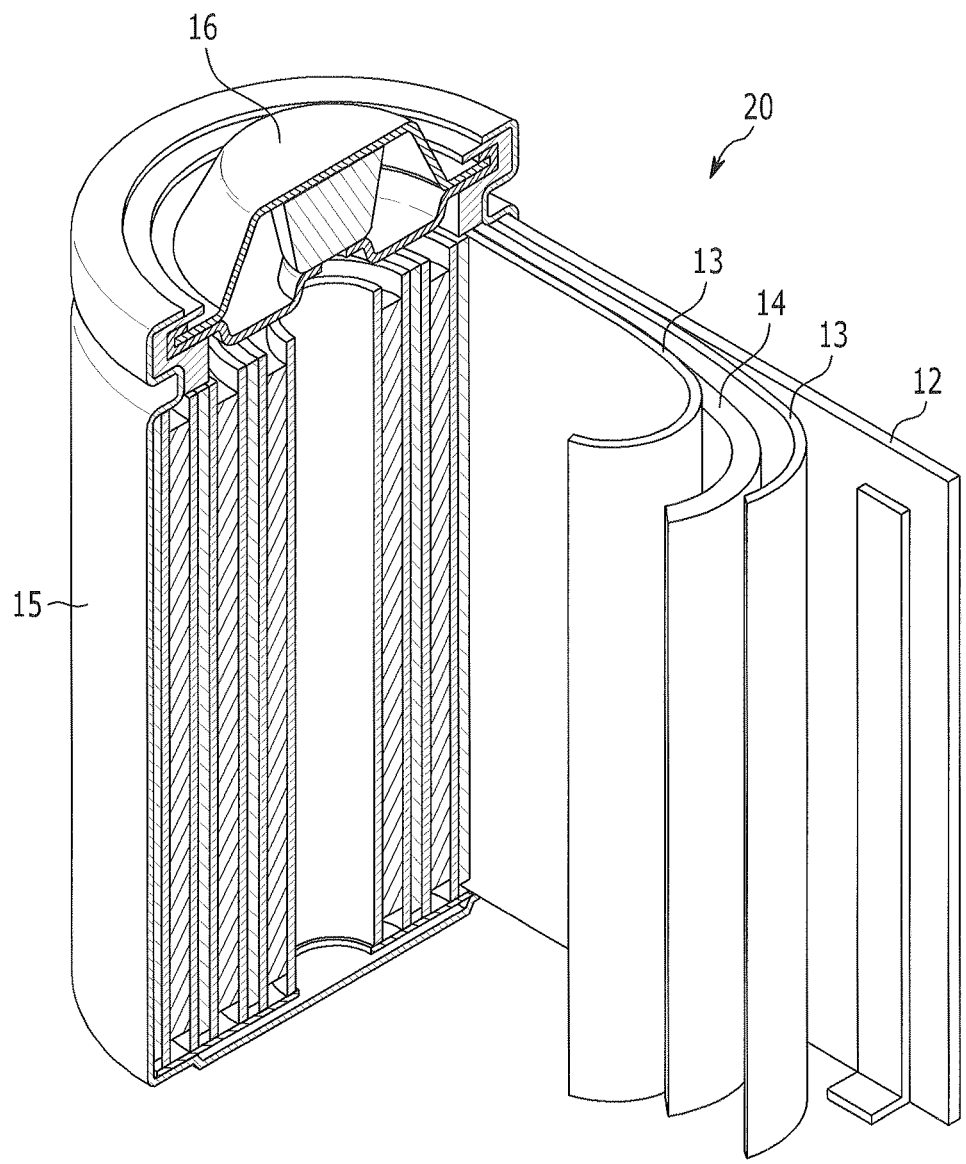
FIG. 2 is a schematic view showing a rechargeable lithium battery according to one embodiment.

FIG. 2 is a schematic view showing the representative structure of a rechargeable lithium battery according to one embodiment. As shown in FIG. 2, the rechargeable lithium battery 20 includes a positive electrode 12, a negative electrode 14, and a separator 13 interposed between the positive electrode 12 and negative electrode 14, an electrolyte immersed therein, a battery case 15, and a sealing member 16 sealing the battery case 15.

The following examples illustrate the invention in more detail. These examples, however, are not in any sense to be interpreted as limiting the scope of the invention.

Example 1

$LiCoO_2$ and F-doped MgO were introduced into a mechanofusion device and performed with a mechanofusion process of rotating in a low speed of about 1000 rpm for about 10 minutes and then rotating at about 2000 rpm for about 5 minutes. According to the mechanofusion process, a positive active material, which included a $LiCoO_2$ core and a MgO (F-doped) present as an island shape on the surface of $LiCoO_2$ core, was provided. At this time, F-doped MgO included F doping amount of about 200 ppm and had a size of about 100 nm, was used as the F-doped MgO. In addition, MgO was included in about 3 wt % based on the total amount of positive active material. The F-doped MgO had an energy gap of about 4 eV.

Example 2

$LiCoO_2$ and F-doped MgO were introduced into a mechanofusion device and performed with a mechanofusion process of rotating in a low speed of 1000 rpm for about 10 minutes and then rotating at about 2000 rpm for about 5 minutes. At this time, F-doped MgO included F doping amount of about 200 ppm and had a size of about 100 nm, was used as the F-doped MgO.

The obtained product according to the mechanofusion process was heated at about 970° C. for about 4 hours to provide a positive active material including a $LiCoO_2$ core and a MgO (F-doped) present as an island shape on the core surface. In addition, MgO was included in about 3 wt % based on the total amount of positive active material. The F-doped MgO had an energy gap of about 3.8 eV.

Example 3

A positive active material including a $LiCoO_2$ core and a MgO (F-doped) present as an island shape on the core surface was prepared in accordance with the same procedure as in Example 1, except that F-doped MgO had the average size of about 150 nm and had F-doping amount of about 200 ppm, was used. MgO was included in about 3 wt % based on the total amount of positive active material. The F-doped MgO had an energy gap of about 4.2 eV.

Example 4

A positive active material including a $LiCoO_2$ core and a MgO (F-doped) present as an island shape on the core surface was prepared in accordance with the same procedure as in Example 1, except that F-doped MgO had the average size of about 408 nm and had F-doping amount of about 200 ppm, was used. MgO was included in about 3 wt % based on the total amount of positive active material. The F-doped MgO had an energy gap of about 4.5 eV.

Example 5

A positive active material including a $LiCoO_2$ core and a MgO (F-doped) present as an island shape on the core surface was prepared in accordance with the same procedure as in Example 1, except that F-doped MgO had the average size of about 540 nm and had F-doping amount of about 200 ppm, was used. MgO was included in about 3 wt % based on the total amount of positive active material. The F-doped MgO had an energy gap of about 4.5 eV.

Comparative Example 1

$LiCoO_2$ was used as a positive active material.

Comparative Example 2

F-doped MgO was added into an N-methylpyrrolidone solvent to provide a coating liquid. $LiCoO_2$ was immersed into the coating liquid and dried to provide a positive active material that a MgO (doped with F) coating layer was formed on the $LiCoO_2$ surface. At this time, F-doped MgO, having a F doping amount of about 200 ppm and a MgO size of about 408 nm, was used as the F-doped MgO. MgO coating layer was included in about 3 wt % based on the total amount of positive active material. The F-doped MgO had an energy gap of about 5 eV.

SEM Photographs

Figure 3:
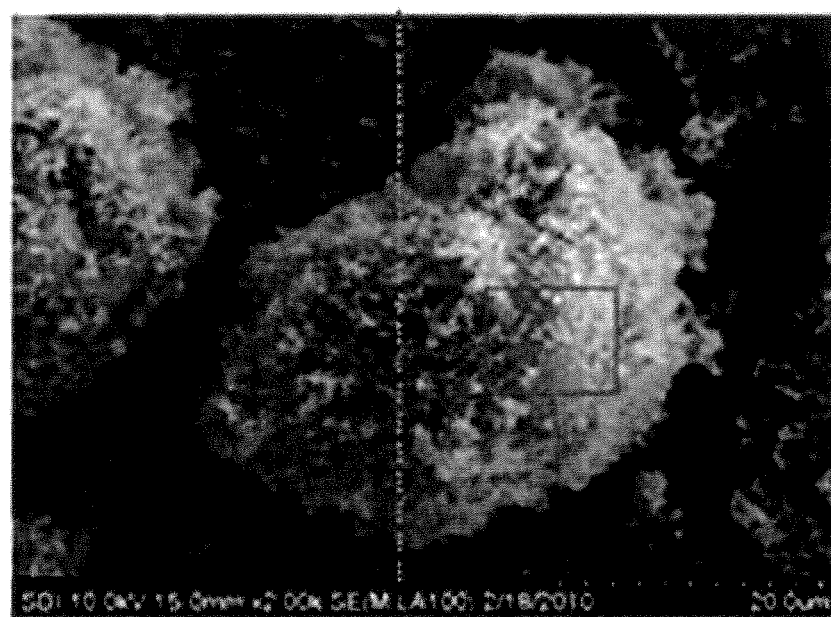
FIG. 3 is a 2000-times magnified SEM photograph (a) and a 50000-magnified SEM photograph (b) of the positive active material obtained from Example 1.
Figure 3:
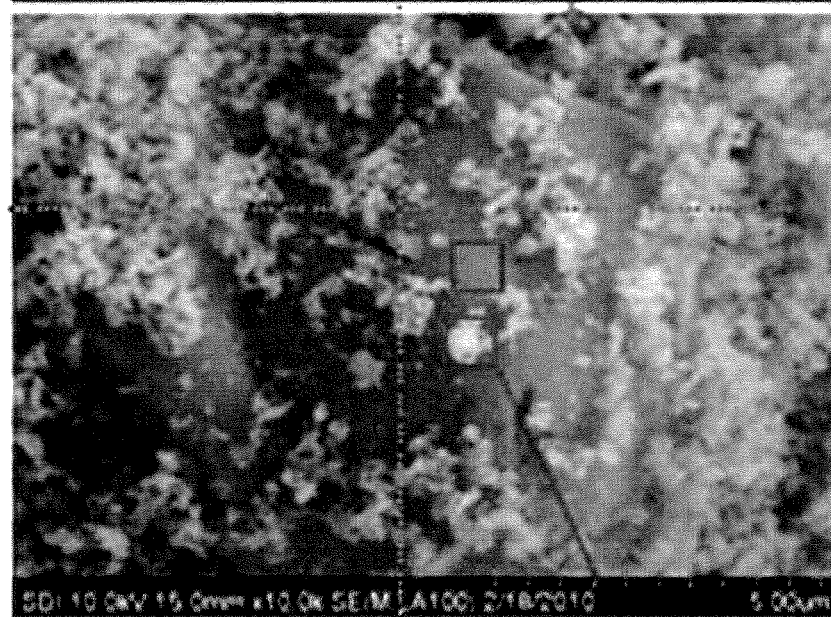
Figure 3:
Figure 3:

FIG. 3(a) shows a 2000-times magnified SEM photograph of the positive active material obtained from Example 1; and FIG. 3(b) shows a part enlarged view (50000 times magnification) of FIG. 3(a). As shown in FIGS. 3(a) and 3(b), the positive active material according to Example 1 included a $LiCoO_2$ (LCO) core and a MgO doped with F (MgO:F), and was present as an island on the core surface.

Figure 4:
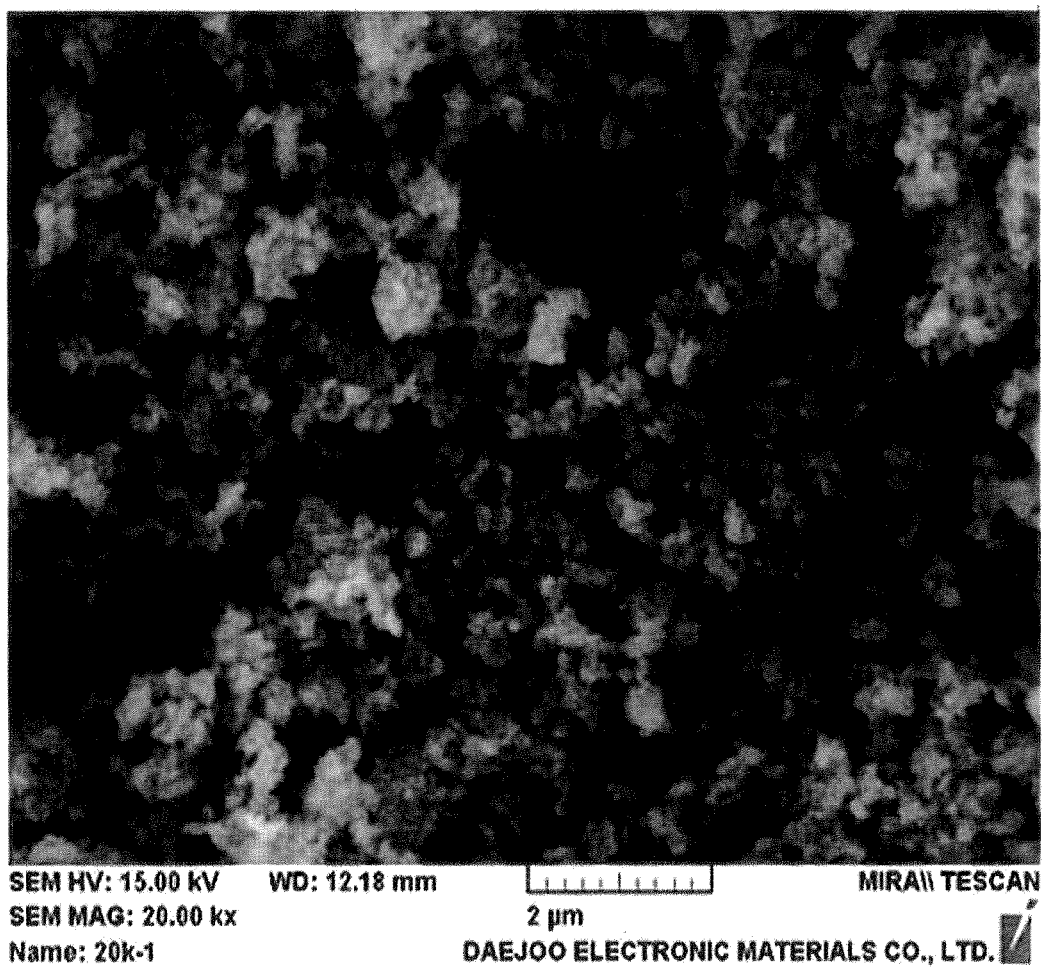
FIG. 4 is a 1000-times magnified SEM photograph of the positive active material obtained from Example 3.
Figure 5:
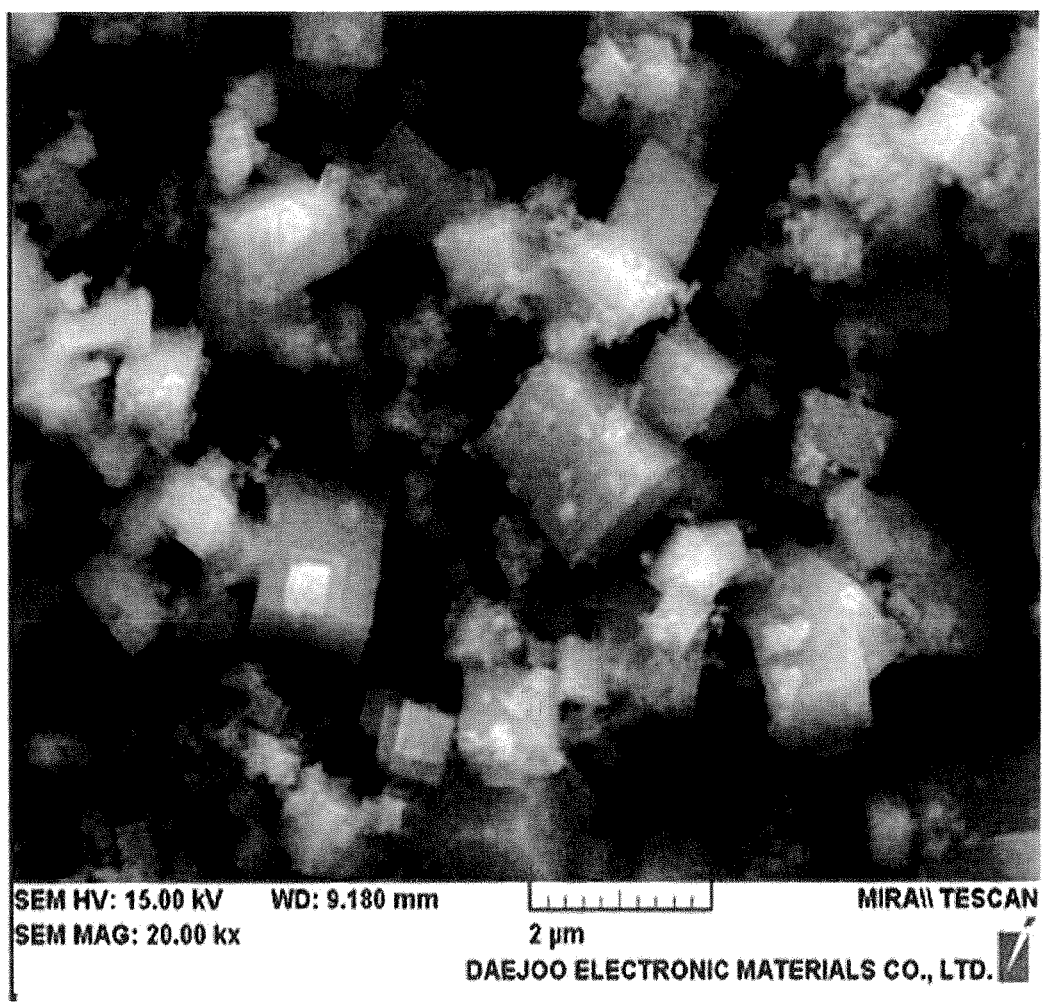
FIG. 5 is a 1000-times magnified SEM photograph of the positive active material obtained from Example 4.
Figure 6:
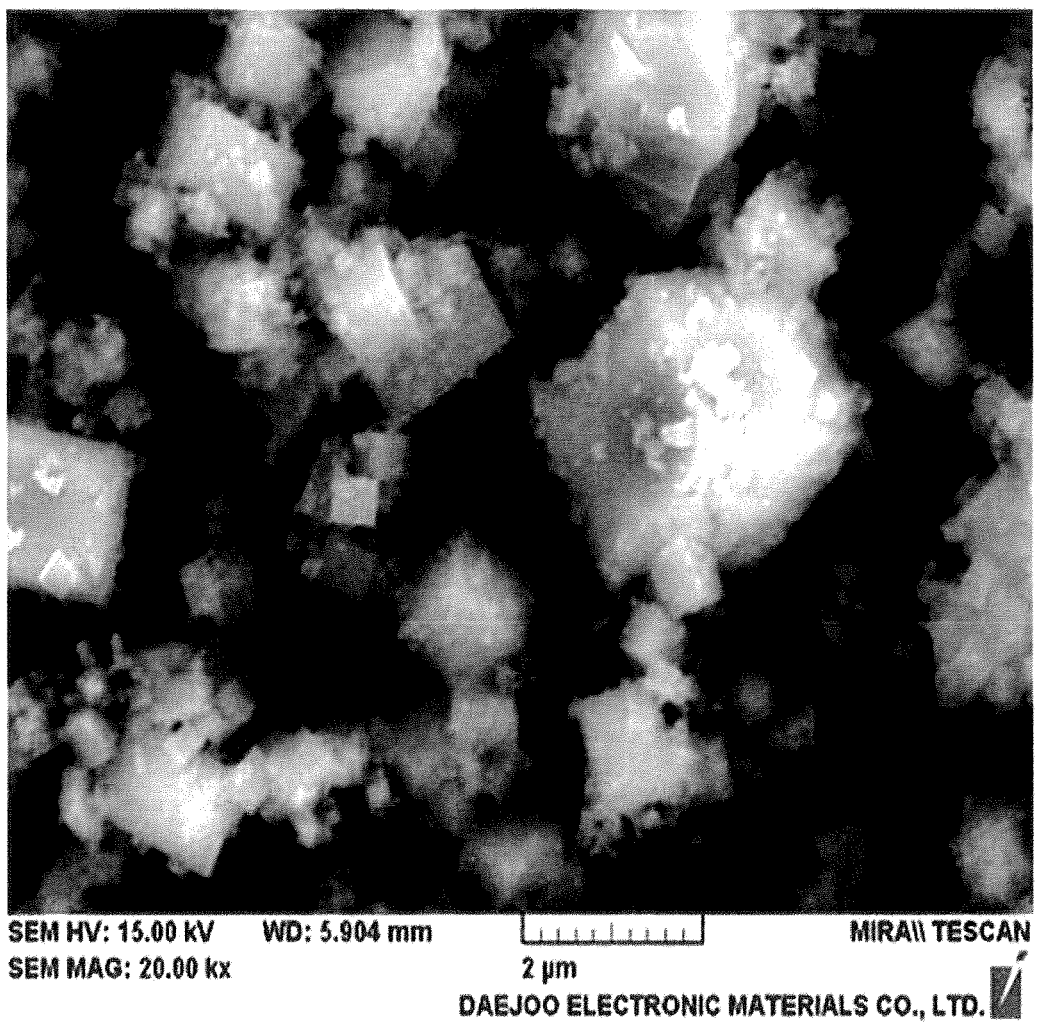
FIG. 6 is a 1000-times magnified SEM photograph of the positive active material obtained from Example 5.

FIG. 4 to FIG. 6 show 1000-times magnified SEM photographs of positive active materials obtained from Examples 3 to 5. As the SEM photographs shown in FIG. 4 to FIG. 6 are similar to those of FIGS. 3(a) and 3(b), the positive active materials according to Examples 3 to 5 also included a $LiCoO_2$ (LCO) core and a MgO doped with F (MgO:F), and was present as an island shape on the core surface.

Measurement of X-Ray Diffraction

Figure 7:
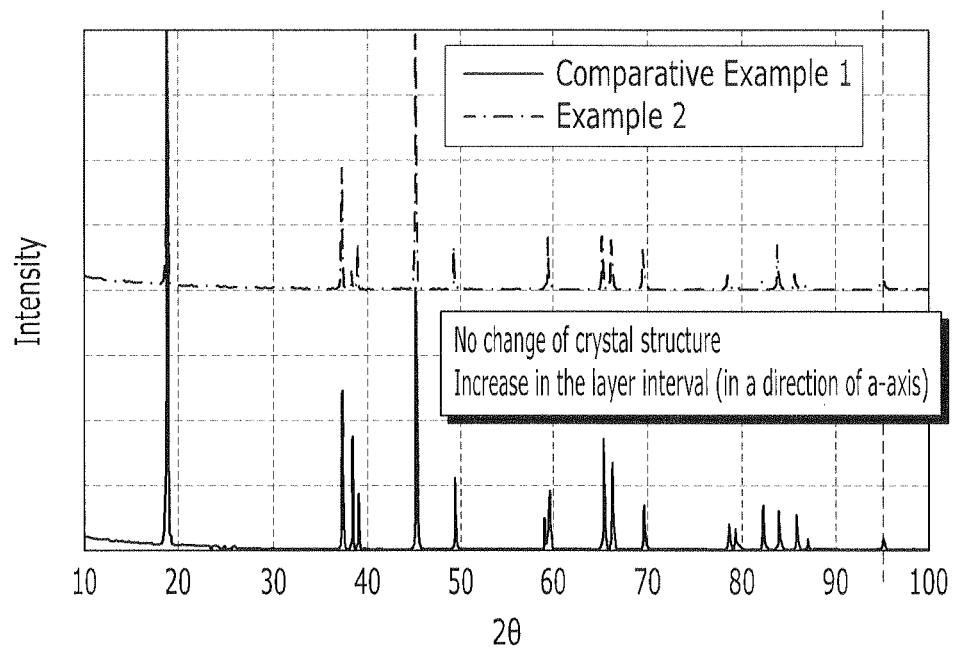
FIG. 7 is a graph showing X-ray diffraction results using CuKα for positive active materials obtained from Example 2 and Comparative Example 1.

The positive active materials obtained from Example 2 and Comparative Example 1 were measured for X-ray diffraction using CuKα, and the results are shown in FIG. 7 and the following Table 1.

TABLE 1

| | XRD | | | | |
|---|---|---|---|---|---|
| | a(Å) | c(Å) | α(deg.) | β(deg.) | γ(deg.) |
| Example 1 | 2.821 | 14.076 | 90.0 | 90.0 | 120.0 |
| Comparative Example 1 | 2.815 | 14.045 | 90.0 | 90.0 | 120.0 |

As shown in Table 1 and FIG. 7, even though it was heated at the high temperature, the crystal structure did not changed and the layer interval was widened somewhat. If widening the layer interval, it may facilitate the transportation of lithium ions to decrease the resistance during transporting lithium ions. Resultantly, it may improve the cycle life characteristics.

Measurement of Average Size and Specific Surface Area (BET)

The positive active materials obtained from Examples 3 to 5 were measured for the average size and the specific surface area (BET), and the results are shown in the following Table 2.

trode, and an electrolyte, a 25 mAh-grade pouch battery cell was fabricated. The negative electrode was prepared by mixing a negative active material of soft carbon (trade mark: GS-S4, manufactured by GS Caltex), a conductive material of Super P, and a binder of polyvinylidene fluoride (trade mark: solef 6062) in a solvent of N-methylpyrrolidone to provide a negative active material slurry; coating the slurry on a Cu foil; drying and pressing the same. The electrolyte was prepared by dissolving a 1.15M of $LiPF_6$ into a mixed solvent (3:4:3 volume ratio) of ethylene carbonate (EC), ethylmethyl carbonate (EMC), and dimethyl carbonate (DMC).

Figure 8:
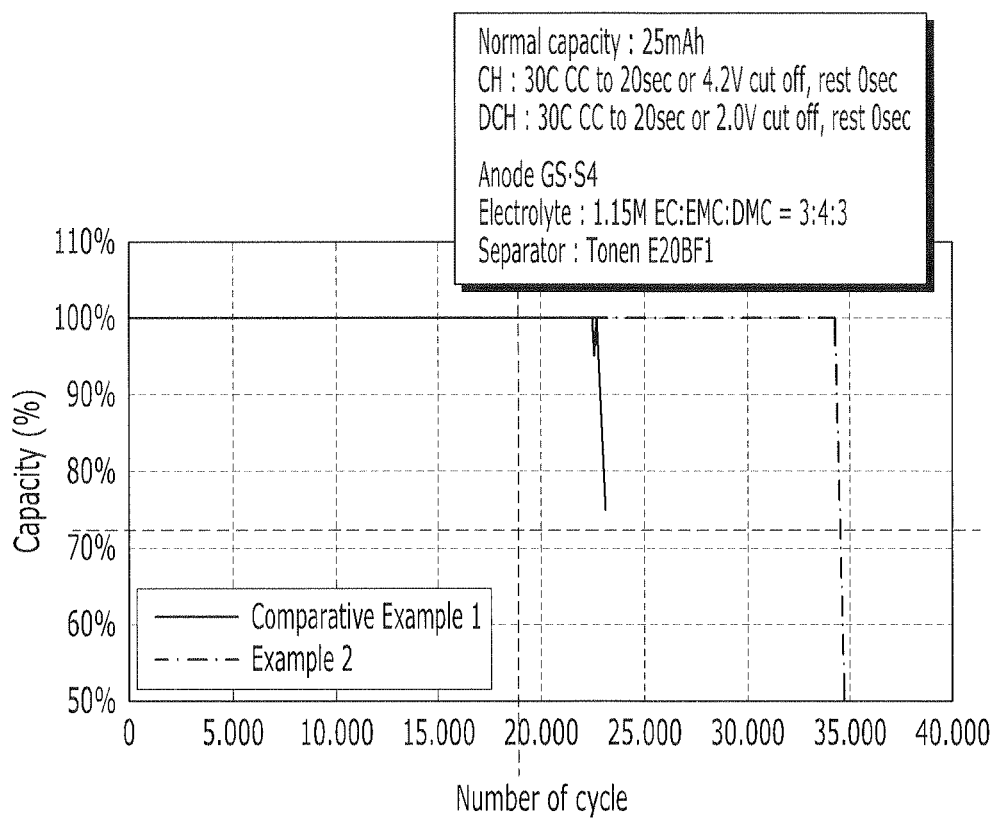
FIG. 8 is a graph showing high-rate charge and discharge characteristics of rechargeable lithium battery including positive active materials obtained from Example 2 and Comparative Example 1.

The obtained battery cell was charged at about 30 C from about 2V to about 4.2V and discharged from about 4.2V to about 2V and repeated the charge and discharge for about 35000 times, and measured for a capacity retention. The results are shown in FIG. 8. The capacity retention was shown in % of discharge capacity at each cycle to the first discharge capacity. As shown in FIG. 8, the battery cell including the positive active material obtained from Example 2 rarely deteriorated the capacity until repeating the charge and discharge at 30 C high-rate for about 34000 times; on the other hand, the battery cell including the positive active material according to Comparative Example 1 remarkably deteriorated the capacity if repeating for about 22000 times.

Evaluation of High-rate Characteristics

Using the positive active material obtained from Examples 3 to 5 and Comparative Example 2, a rechargeable lithium

TABLE 2

| | Comparative Example 1 | Comparative Example 2 | Example 1 | Example 2 | Example 3 | Example 4 | Example 5 |
|---|---|---|---|---|---|---|---|
| Average size (nm) | 408 | 408 | 408 | 408 | 150 | 408 | 540 |
| Specific surface area (m²/g) | 4.1 | 4.1 | 4.1 | 4.1 | 11 | 3.1 | 4.1 |

Evaluation of Cycle Life

About 85 wt % of each positive active materials obtained from Example 2 and Comparative Example 1, about 5 wt % of activated carbon, about 4 wt % of Super P conductive material, and about 6 wt % of polyvinylidene fluoride binder (trade mark: solef 6062) were mixed in a N-methylpyrrolidone solvent to provide a positive active material slurry.

The obtained positive active material slurry was formed on an Al foil and dried, and pressed to provide a positive electrode. With the obtained positive electrode, a negative elecbattery cell was fabricated in accordance with the same procedure as in the method for measuring the cycle-life characteristic. The battery cell was charged and discharged at each 1 C, 5 C, 10 C, 20 C, 30 C, and 50 C for one time to measure the charge and discharge capacity at each rate. If the measured charge capacity and discharge capacity at 1 C is intended to 100%, the charge capacity % and the discharge capacity % at each rate were calculated with respect to the charge capacity and the discharge capacity at 1 C. The results are shown in the following Table 3.

TABLE 3

| | Example 4 | | Example 5 | | Example 3 | | Comparative Example 2 | |
|---|---|---|---|---|---|---|---|---|
| | charge (relative to one at 1 C) | discharge (relative to one at 1 C) | charge (relative to one at 1 C) | discharge (relative to one at 1 C) | charge (relative to one at 1 C) | discharge (relative to one at 1 C) | charge (relative to one at 1 C) | discharge (relative to one at 1 C) |
| 1 C | 100% | 100% | 100% | 100% | 100% | 100% | 100% | 100% |
| 5 C | 95% | 91% | 85% | 87% | 87% | 91% | 56% | 59% |
| 10 C | 82% | 84% | 72% | 79% | 77% | 85% | 29% | 41% |
| 20 C | 61% | 75% | 53% | 70% | 62% | 78% | 8% | 29% |
| 30 C | 44% | 67% | 35% | 62% | 49% | 73% | 2% | 22% |
| 50 C | 22% | 51% | 13% | 13% | 25% | 59% | 2% | 11% |

As shown in Table 3, it is understood that the rechargeable lithium battery cells including positive active materials obtained from Examples 3 to 5 had superior high-rate charge and discharge characteristics to those of Comparative Example 2. Particularly, as the F-doped MgO had the smaller size, it may further improve the high-rate charge and discharge characteristics.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. The aforementioned embodiments are exemplary but are not limiting in any way.

What is claimed is:

1. A positive active material for a rechargeable lithium battery, comprising:
   a core comprising a lithiated intercalation compound; and
   particles of MgO disposed on a surface of the core, the particles of MgO being present in an island formation and having an average nano-size, the particles of MgO being doped with M, where M is F, C, N, Si, S, Se, As, Sb, In, Te, P, or a combination thereof.

2. The positive active material for a rechargeable lithium battery of claim 1, wherein the particles of MgO have an average size of about 10 nm or more and less than about 1000 nm.

3. The positive active material for a rechargeable lithium battery of claim 1, wherein the particles of MgO have an average size of about 10 nm to about 500 nm.

4. The positive active material for a rechargeable lithium battery of claim 1, wherein each of the particles of MgO is doped with M in about 100 ppm to about 400 ppm.

5. The positive active material for a rechargeable lithium battery of claim 1, wherein each of the particles of MgO doped with M has an energy gap of about 3.0 eV to about 8.0 eV.

6. The positive active material for a rechargeable lithium battery of claim 1, wherein an amount of the particles of MgO ranges from about 0.1 wt % to about 30 wt % based on the entire weight of the positive active material.

7. A method of manufacturing a positive active material for a rechargeable lithium battery comprising:
   performing mechanofusion process of a lithiated intercalation compound with particles of MgO, the positive active material for the rechargeable lithium battery comprising:
   a core comprising a lithiated intercalation compound; and
   the particles of MgO disposed on a surface of the core, the particles of MgO being present in an island formation and having an average nano-size, the particles of MgO being doped with M, where M is F, C, N, Si, S, Se, As, Sb, In, Te, P, or a combination thereof.

8. The method of claim 7, further comprised of heating a product obtained by the performing the mechanofusion process.

9. The method of claim 8, wherein the heating process is performed at about 900° C. to about 980° C.

10. A rechargeable lithium battery comprising:
    a positive electrode comprising a positive active material comprising:
       a core comprising a lithiated intercalation compound; and
       particles of MgO disposed on a surface of the core, the particles of MgO being present in an island formation and having an average nano-size, the particles of MgO being doped with M, where M is F, C, N, Si, S, Se, As, Sb, In, Te, P, or a combination thereof;
    a negative electrode comprising a negative active material; and
    an electrolyte.

11. The rechargeable lithium battery of claim 10, wherein the particles of MgO has an average size of about 10 nm or more and less than about 1000 nm.

12. The rechargeable lithium battery of claim 10, wherein the particles of MgO has an average size of about 10 nm to about 500 nm.

13. The rechargeable lithium battery of claim 10, wherein each of the particles of MgO is doped with M in about 100 ppm to about 400 ppm.

14. The rechargeable lithium battery of claim 10, wherein each of the particles of MgO doped with M has an energy gap of about 3.0 eV to about 8.0 eV.

15. The rechargeable lithium battery of claim 10, wherein an amount of the particles of MgO ranges from about 0.1 wt % to about 30 wt % based on the entire weight of the positive active material.

* * * * *